(12) United States Patent
Ishihara

(10) Patent No.: US 7,234,867 B2
(45) Date of Patent: Jun. 26, 2007

(54) LINEAR MOTION GUIDE UNIT

(75) Inventor: Toyohisa Ishihara, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 159 days.

(21) Appl. No.: 11/180,632

(22) Filed: Jul. 14, 2005

(65) Prior Publication Data
US 2006/0029306 A1 Feb. 9, 2006

(30) Foreign Application Priority Data
Aug. 6, 2004 (JP) ............................. 2004-230993

(51) Int. Cl.
F16C 29/06 (2006.01)
(52) U.S. Cl. ........................................ 384/45
(58) Field of Classification Search .................. 384/45, 384/44, 43; 464/164
See application file for complete search history.

(56) References Cited
U.S. PATENT DOCUMENTS
6,200,031 B1 3/2001 Faulhaber et al.
6,520,681 B2 2/2003 Ishihara
2002/0141667 A1 10/2002 Ishihara

FOREIGN PATENT DOCUMENTS
JP 9264322 10/1997
JP 2002295469 10/2002

*Primary Examiner*—Lenard A. Footland
(74) *Attorney, Agent, or Firm*—Browdy and Neimark, PLLC

(57) ABSTRACT

A linear motion guide unit is disclosed, in which components required for a slider are all joined together with no fasteners including bolts, screws, and so on used conventional assembly operations, but mutual fit-engagement of any components with their mating counterparts. This allows reducing the number of components to cope with a modern tendency of miniaturization of the linear motion guide system. The slider includes a carriage casing composed of end panels facing forward and aft ends of a carriage, one to each end, and side panels facing widthwise opposing sides of the carriage, one to each, the end and side panels being connected integrally to surround the carriage. To complete the slider, the carriage first fits between the end panels of the carriage casing. Then, end caps are applied to outward surfaces of the end panels of the carriage casing and joined together by making fit-engagement of mating parts on the end caps with counterparts on the carriage and carriage casing complementary to the mating parts.

9 Claims, 11 Drawing Sheets

LINEAR MOTION GUIDE UNIT

FIELD OF THE INVENTION

The present invention relates to a linear motion guide unit ready for miniaturization in size and comprised of a guide rail having a raceway groove thereon and a slider that fits over and conforms to the guide rail for movement relative to the guide rail by virtue more than one rolling element.

BACKGROUND OF THE INVENTION

Linear motion guide units are conventionally used in any relatively sliding arrangement in diverse fields of machinery such as various industrial robots, semiconductor manufacturing apparatus, precision machines, and so on. Most prior linear motion guide units are in general comprised of a guide rail and a slider that fits over the guide rail for relative movement, the slider being composed of a carriage and end caps, which are joined together with fastening means such as screws and so on.

Meanwhile, linear motion guide units are now known in which there is no need of fastening means such as tightening screws to join a carriage together with forward and aft end caps.

For example in the commonly assigned Japanese Patent Laid-Open No. 2002-295469, there is disclosed a linear motion guide unit in which a slider is made up of a carriage, a pair of end caps positioned on the forward and aft ends of the carriage, one to each end, and a carriage housing to accommodate therein the carriage together with the forward and aft end caps. The carriage housing is made in a rectangular frame having widthwise opposite side panels facing the outward surfaces of the carriage and forward and aft end panels facing outside surfaces of the end caps. On the inward surfaces of the side panels in the carriage housing, there are provided raised portions complementary in contour to recesses in the carriage to fit into their associated recesses. Mutual fit of the raised portions into their associated recesses to keep the end caps within the carriage housing makes it easier to join the carriage and the end caps together with the carriage housing to finish the slider with no use of fastening elements including bolts, screws, and so on, which have been needed in the prior slider assembly.

With the prior linear motion guide unit in which the carriage and a pair of the end caps are installed inside the carriage housing all at once as recited earlier, nevertheless, the assembly operations need several more chores that might give rise to error cumulative in assembly operations.

A linear guide arrangement is disclosed in, for example Japanese patent No. 2936166, in which there is no need for any fastening elements to join a carriage and end caps together. The prior linear guide arrangement has a guide carriage including a guide carriage housing into which a carriage member fits together with forward and aft reversing bodies. In assembled state of the guide carriage, projections of the reversing bodies make engagement with longitudinal grooves cut in the carriage member while strips on the reversing bodies come into snap-engagement with their associated slots cut into end panels of the guide carriage housing. With the prior linear guide arrangement recited earlier, in other words, the combination of the carriage member with the reversing bodies are secured in position inside the guide carriage housing by means of snap-action engagement. Thus, the prior linear guide arrangement has no fastening elements including screws, and so on to join the components together. Upon assembly of the prior linear guide arrangement, the reversing bodies are joined on the forward and aft ends of the carriage member with the projections out of the reversing bodies coming into lying on the upper surface of the carriage member, and then the combination so formed is introduced into the guide carriage housing with the reversing bodies being surrounded along their outward surfaces with the guide carriage housing, and at the same time secured within the guide carriage housing with snap-action engagement. In addition, the prior linear guide arrangement has therein rolling element circuits including return guides in the guide carriage housing and turnaround guides in the reversing bodies.

The prior linear guide arrangement could not still get out of error cumulative in assembly operations to fit the combination of the carriage member with the forward and aft reversing bodies into the guide carriage housing.

SUMMARY OF THE INVENTION

The present invention, therefore, has as its primary object to overcome the challenges as stated earlier and particularly is envisaged more developing a linear motion guide unit disclosed in the commonly assigned Japanese Patent Laid-Open No. 2002-295469 recited earlier into an advanced version easier in assembly with accuracy and also more conformable to miniaturization for use in very small machines. With the linear motion guide unit according to the present invention, to this end, a carriage alone is allowed to simply fit in between forward and aft end plates of the carriage casing to install the carriage with accuracy within the carriage casing, while forward and aft end caps can be just applied on outward end surfaces of the carriage casing. The carriage, end caps and carriage casing are all assembled easier with accuracy into the finished linear motion guide unit by the use of only fit-engagement of mating parts mutually complementary to one another, which are made on the carriage, end caps and carriage casing.

The present invention is concerned with a linear motion guide unit; comprising a guide rail having first raceway grooves on lengthwise sides thereof, and a slider conforming to the guide rail to fit over the guide rail for movement relatively to the guide rail by virtue of more than one rolling element; wherein the slider is composed of a carriage having second raceway grooves in opposition to the first raceway grooves to define load races between them and having return passages in parallel with the load races, end caps arranged on fore-and-aft ends of the carriage, one to each end, and each made therein with the turnaround passages to communicate the load races with the return passages, and end seals installed on the end surfaces of the end caps, one to each end cap, the carriage and the end caps joining together with one another to establish recirculating circuits including the load races, turnaround passages and the return passages to allow the rolling elements to roll through there; wherein the slider further includes a carriage casing composed of sidewise opposing fore-and-aft side panels and forward and aft end panels spaced fore and aft and made integral with the side panel; and wherein the carriage, carriage casing and the end caps are joined together to form a complete slider in a way that the carriage fits into the carriage casing between the forward and aft end panels and further the end caps are joined to outward end surfaces of the end panels of the carriage casing where the carriage has fit into there, with using fit-engagement of mating parts of the end caps with other complementary mating parts on both the carriage casing and the carriage.

In an aspect of the present invention, a linear motion guide unit is disclosed in which the end panels of the carriage casing are provided integrally thereon with pillars made thereon with radially inside turnaround grooves for the turnaround passages.

In another aspect of the present invention, a linear motion guide unit is disclosed in which the mating parts made on the carriage are minor grooves cut along fore-and-aft major grooves that are made on widthwise opposing sides of the carriage, while the mating parts on the end caps are first projections raised on return spigot of the end caps to get fit into the minor grooves cut in the carriage.

In another aspect of the present invention, a linear motion guide unit is disclosed in which the mating parts made on the carriage casing include first recesses made in the side panels to fit over second projections that are formed on flanges of the end caps to be complementary to the first recesses, third projections made in the end panels to fit into second recesses that are cut in the flanges of the end caps to be complementary to the third projections, fourth projections raised above inward surfaces of the side panels to fit into grooves that are cut in sides of the end caps to be complementary to the fourth projections, and third recesses made in inward surfaces of the side panels within the carriage casing to fit over fifth projections that are made on the return spigots of the end caps.

In another aspect of the present invention, a linear motion guide unit is disclosed in which the mating parts of the end caps include the second projections and the second recesses, which are both made on the flanges of the end caps, the fifth projections made on the return spigots of the end caps to fit into the third recesses cut in the side panels of the carriage casing, the first projections raised on return spigot of the end caps to fit into minor grooves cut in the carriage, and the grooves cut in the sides of the end caps to fit over the fourth projections raised above the inward surfaces of the side panels to guide the end caps along there.

In a further another aspect of the present invention, a linear motion guide unit is disclosed in which the end seals have mating parts including sixth projections made on upper edges of the end seals to fit into first holes in the flanges of the end caps, and seventh projections made on lower edges of the end seals to fit into bottoms of the carriage casing where the end seals are applied there, so that the end seals come into fit-engagements with both the flanges of the end caps and the bottoms of the carriage casing.

In another aspect of the present invention, a linear motion guide unit is disclosed in which lubricant applicators are arranged in opposition to the major grooves so that the return passages are made up of first return grooves made in the major grooves and second return grooves made in the lubricant applicators, which merge with one another into the return passages.

In another aspect of the present invention, a linear motion guide unit is disclosed in which assembly of the end caps on the carriage casing is carried out in a way that the end caps are first applied to the carriage casing in such a relation the fourth projections cut in the inward surfaces of the side panels make interim fit-engagement with slots made in parallel with the grooves on the sides of the end caps, then followed by making final fit-engagement with the grooves on the sides of the end caps after the fourth projections have further forced to make press fit into the grooves.

In another aspect of the present invention, a linear motion guide unit is disclosed in which the third projections made on the end panels of the carriage casing to fit into the second recesses in the end caps are made in shape susceptible to elastic deformation to make it easier to get them press fit into the second recesses.

With the linear motion guide unit constructed as stated earlier, the slider used in the prior linear motion guide unit may be made simple in construction, easier in assembly so as to reduce error cumulative in assembly operations. According to the present invention, the carriage alone is allowed to simply fit in between forward and aft end plates of the carriage casing to install the carriage with accuracy within the carriage casing, while the forward and aft end caps are just applied on the outward end surfaces of the carriage casing. The carriage, end caps and carriage casing are all joined together with no fasteners including bolts, screws, and so on used conventional assembly operations, but mutual fit-engagement of mating parts mutually complementary to one another. This helps lessen any error cumulative in assembly operations even with making certain of steady joining relation among the components with accuracy. In other words, the carriage is first fit into the carriage casing and, then, the end caps 4 are fit on the outward edges of the carriage casing in such a way that the mating parts of the end caps fit into their complementary mating parts of the carriage to keep steadily the carriage against up-and-down movement in the carriage casing.

The end caps are applied on the outward end surfaces of the carriage casing while getting their some mating parts to fit with the complementary mating parts of the carriage casing. The end caps are finally secured on the outward surfaces of the carriage casing after the other mating parts of the end caps have brought into fit-engagement with the other complementary mating parts on the outward end surfaces of the carriage casing. Moreover, the end seals are secured on the outward ends of the end caps after the mating parts of the end seals have made fit-engagement with the complementary mating parts of both the end caps and the carriage casing.

With the linear motion guide unit of the present invention as stated earlier, the carriage casing, carriage, end caps and the end seals are all joined together by simple using the systematic fit-engagement of mating parts with their complementary counterparts into the complete slider that is accurate in construction without entailing the errors cumulative in assembly operations.

DETAILED DESCRIPTION OF THE PREFERRED EMBODIMENT

Figure 1:
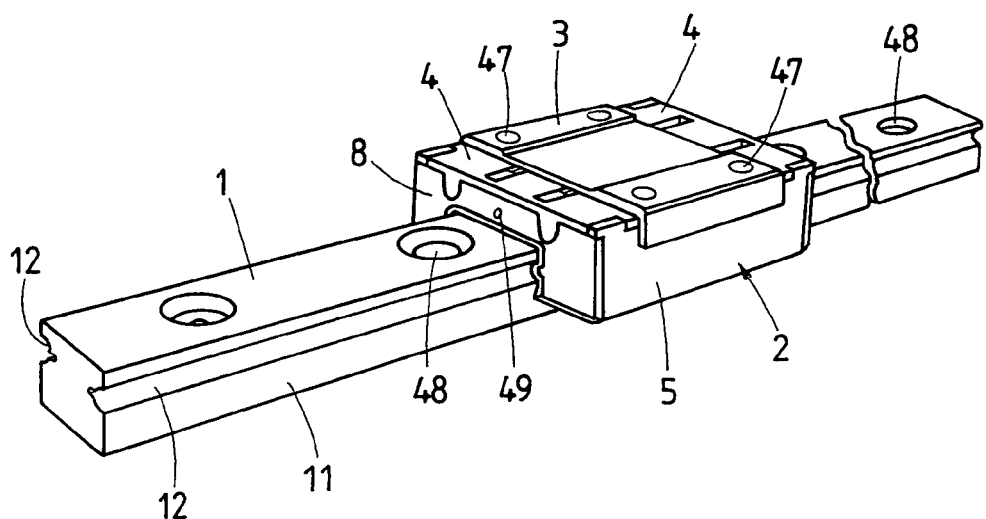
FIG. 1 is a view in perspective illustrating an entire construction of a linear motion guide unit according to the present invention.
Figure 2:
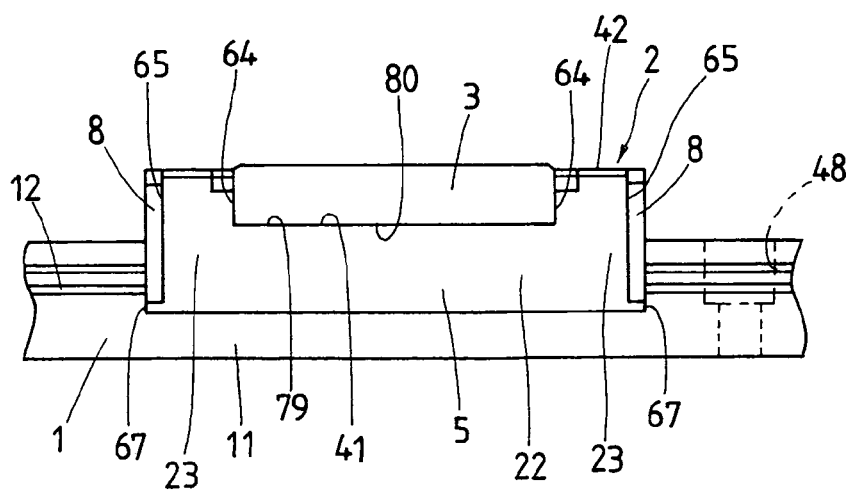
FIG. 2 is a view in front elevation of the linear motion guide unit of FIG. 1.
Figure 3:
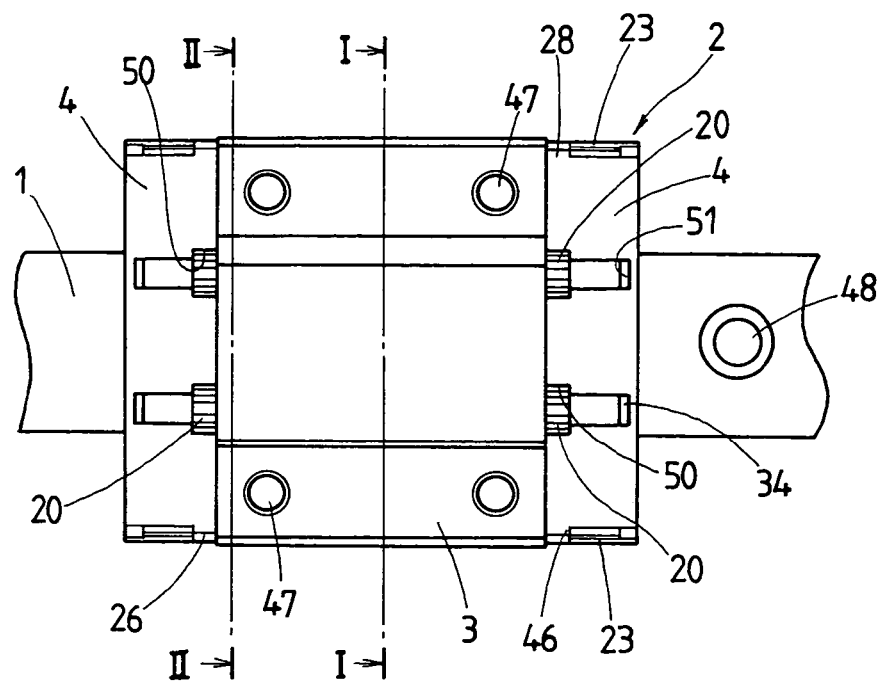
FIG. 3 is a view in plan of the linear motion guide unit of FIG. 2.
Figure 4:
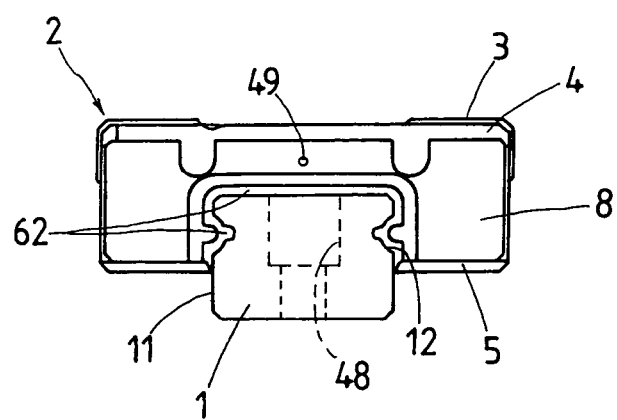
FIG. 4 is a view of side elevation of the linear motion guide unit of FIG. 2.

A linear motion guide unit according of the present invention will be explained in detail by way of a preferred version with reference to the accompanying drawings. The linear motion guide unit according to the present invention is adapted for use in any relatively sliding components in machinery as diverse as various robots, semiconductor manufacturing machines, precision machines, measurement/inspection instruments, medical instruments, micromachines, machine tools, and so on, and more particular constructed as small as possible in size, even with making sure of desired performance including high stiffness, smooth traveling, high precision, and so on.

The linear motion guide unit disclosed hereinafter is made of a type in which a slider 2 fits over and conforms to a guide rail 1 and the slider 2 is constituted with a carriage, carriage casing, end caps and end seals. More than one slider may fit over the guide rail 1 for relative movement one another.

The linear motion guide unit of the present invention, as shown in FIGS. 1 to 7, is in general comprised of a guide rail 1 having widthwise opposing sides 11 made thereon with lengthwise raceway grooves 12 or first raceway grooves, one to each side, and a slider 2 that fits over and conforms to the guide for movement by virtue of more than one rolling element 15, which is a ball in the version discussed here. With the slider 2 constructed according to the present invention, required components: carriage 3, end caps 4, carriage casing 5 and end seals 8 are all joined together with no fasteners including bolts, screws, and so on used conventional assembly operations, but mutual fit-engagement of any components with their mating counterparts. The slider 2 is made thereon with fore-and-aft raceway grooves 13 or second raceway grooves confronting the first raceway grooves 12 to define load raceways 24 between them. The slider 2 is mainly comprised of the carriage 3 made therein with return passages 17 extending in substantially parallel with the load raceways 24, the end caps positioned at forward and aft ends 64 of the carriage 3, one to each end, and made therein with turnaround passages 14 to connect the load raceways 24 with their associated return passages 17, the end seals 8 attached on forward and aft outward end surfaces 65 of the end caps 4, the carriage casing 5 having a central well 72 to accommodate the carriage 3 therein, and more than one rolling element 15 allowed to roll through recirculating circuits made up of the load raceways 24, return passages 17 and a pair of the turnaround passages 14.

The carriage casing 5 is made up of end panels 23 lying in opposition to the forward and aft ends 64 of the carriage 3 and widthwise spaced side panels 22 lying in opposition to fore-and-aft sides 66 of the carriage 3, the panels 23 and 22 being orthogonally joined together to define the central well 72 of overall rectangular contour when viewed from above. With the carriage casing 5 constructed as stated earlier, moreover, the side panels 22 sinks at their upper edges 41 extending between the forward and aft end panels 23 below upper edges 42 of the end panels 23 to form recesses 79. When the carriage 3 is introduced into the carriage casing 5, widthwise opposing fore-and-aft eaves of the carriage 3 are allowed to fit into the recesses 79 without getting prominent sidewise as undercut bevels 80 that are splayed outwards rest snugly against the upper edges 22 of the side panels 22. Upon assembly of the slider 2, the carriage 3 is first placed in the central well 72 defined between the forward and aft end panels 28 of the carriage casing 5. The end caps 4 are then applied from outward edges 67 of the side panels 22 onto the carriage casing 5 that harbors the carriage 3 therein. As this occurred, just fitting mating parts of the end caps 4 and the carriage casing 5 each other is sufficient to join mutually the end caps 4 with the carriage casing 5. The end panels 23 of the carriage casing 5 are provided integrally with pillars 7 that are made thereon with radially inside curved grooves 16, or turnaround grooves 43, to define the turnaround passages 14. With the linear motion guide unit constructed as stated earlier, in other words, the arrangement in which the radially inside turnaround grooves are cut in the pillars integral with the carriage casing 5 is of advantage to reduction in number of the required parts, compared with the prior arrangement in which the radially inside turnaround grooves are cut in the end caps 4. With the linear motion guide unit in which the carriage alone is introduced into the carriage casing 5, moreover, it is easier to fit the carriage 3 with accuracy into the carriage casing 5 and there is less likelihood of error cumulative in assembly operations.

With the slider 2 constructed according to the present invention, the carriage 3 has fore-and-aft major grooves 25 extending on widthwise opposing sides 66 thereof to fit lubricant applicators 6 therein. The return passages 17 in the carriage 3 are defined between return grooves 18 or first return grooves provided by the fore-and-aft major grooves 25 and return grooves 19 or second return grooves made in the lubricant applicators 6, the first and second return grooves 18, 19 being mated with one another to form the return passages 17. The lubricant applicators 6 are made less in lengthwise dimension than the carriage 3. When joining the end caps 4 together with the carriage 3, accordingly, return spigots 10 extending out of the end caps 4 will be introduced from the forward and aft ends 64 of the carriage 3 until coming into abutment against the forward and aft ends 71 of the lubricant applicators 6. The return passages 17 are made up of all of the return grooves 18 on the carriage 3, the return grooves 19 in the lubricant applicators 6, and the return spigots 10 of the end caps 4.

How to yield the completed slider 2 will be explained later with reference to FIG. 7.

When producing the slider 2 by hand, assembling operations will be carried out according to the following steps after the carriage 3 has been placed on, for example a worktable in a position lying on an upper surface 44 thereof.

Step 1:

The lubricant applicators 6 are fit into the fore-and-aft major grooves 25 on the widthwise opposite sides of the carriage 3. Then, the carriage 3 together with the lubricant applicators 6 is introduced into the central well 72 between the end panels 23 of the carriage casing 5 to such a depth that the undercut bevels 80 of the carriage 3 are just short of making direct abutment against their associated upper edges 41 of the side panels 22. As an alternative, the carriage 3 alone is first introduced into the carriage casing 5 and thereafter, the lubricant applicators 6 are inserted through the outward edges 67 of the carriage casing 5 to conform to the fore-and-aft sides 66 of the carriage 3.

Step 2:

The end caps 4 are fit on the outward edges 67 of the carriage casing 5. As this occurs, ribs 39 or fourth projections raised inward above the side panels 22 of the carriage casing 5 fit into slots 36 cut in sides 68 of the end caps 4. Sliding-fit of the slots 36 over the ribs 39, in other words, helps to direct the end caps 4 towards their correct operational positions relative to the carriage casing 5, where the end caps 4 get raised slightly above apart from bottoms 69 of the carriage casing 5.

Step 3:

The return spigots 10 extending out of the end surfaces 65 fit into the fore-and-aft major grooves 25 in the carriage casing 5 to secure firmly the end caps 4 to the carriage casing 5. As this occurs, noses 54 or first projections raised on the return spigots 10 of the end caps 4 get fit into minor grooves 26 cut in the fore-and-aft major grooves 25 in the carriage 3, keeping the carriage 3 against moving up and down relatively to the carriage casing 5.

Step 4:

More than one rolling element 15 is charged into the recirculating circuits composed of the load raceways 24, return passages 17 and a pair of forward and aft turnaround passages 14. Thereafter, retainer bands 9 are installed in slots 33 cut around the end caps 4 to keep the rolling elements 15 against falling away from the slider 2.

Step 5:

The end seals 8 are arranged on the outward end surfaces 65 of the end caps 4. To this end, upper raised portions or sixth projections 34 of the end seals 8 fit into slits 51 made in flanges 27 of the end caps 4 while notches 52 in the end seals 8 fit over projections 32 on the end caps 4, so that the end seals 8 are secured steadily to the associated end caps 4.

Step 6:

The carriage casing 5 is forced against the carriage 3 to get the upper edges 41 of the side panels 22 to make close abutment against the undercut bevels 80 of the carriage 3. As this occurs, recesses 46 or first recesses, dowels 20 or third projections, ribs 39 or fourth projections and recesses 40 or third recesses made on the carriage casing 5 are brought into fit-engagement with their associated mating parts including sidewise projections 28 or second projections, holes 50 or second recesses, slots 35, and raised portions 45 or fifth projections made on the carriage casing 5. At the same time, lower raised portions 53 or seventh projections come into fit-engagement with slits 39 cut in the bottom 69 of the carriage casing 5.

As the carriage casing 5 is forced ahead towards the carriage 3, the side panels 22 of the carriage casing 5 experience elastic deformations to get the ribs 39 on the side panels 22 jumping from the slots 36 into fit-engagement with other slots 35. The dowels 20 extending above the end panels 20 of the carriage casing 5 are each made of a pair of forked pins that are spaced away from one another to be terminated in distal ends enlarged in thickness. The dowels 20, because of their construction as stated earlier, are easier to experience elastic deformation to make press fit with the holes 50 in the end caps 4. The assembling procedures as recited earlier makes it easier to join the carriage 3, end caps 4, carriage casing 5 and the end seals 8 together with one another into the slider 2 completed with accuracy as well as steady in construction.

Figure 8:
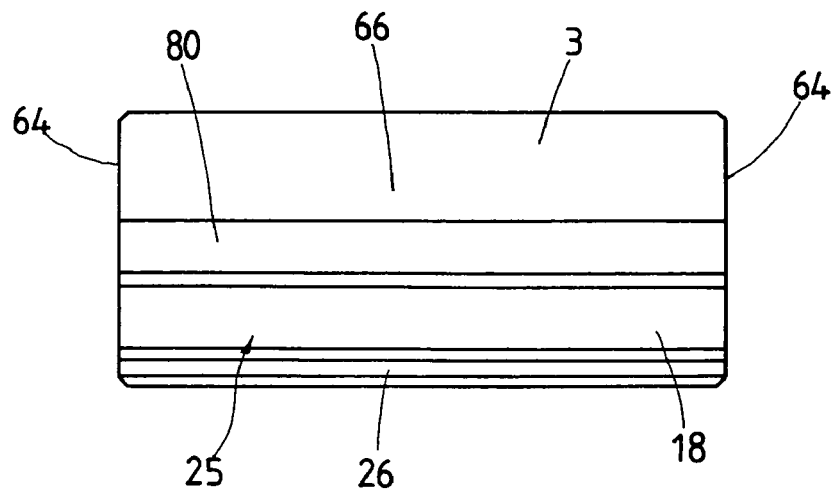
FIG. 8 is a view in front elevation of a carriage in the linear motion guide unit of FIG. 1.
Figure 9:
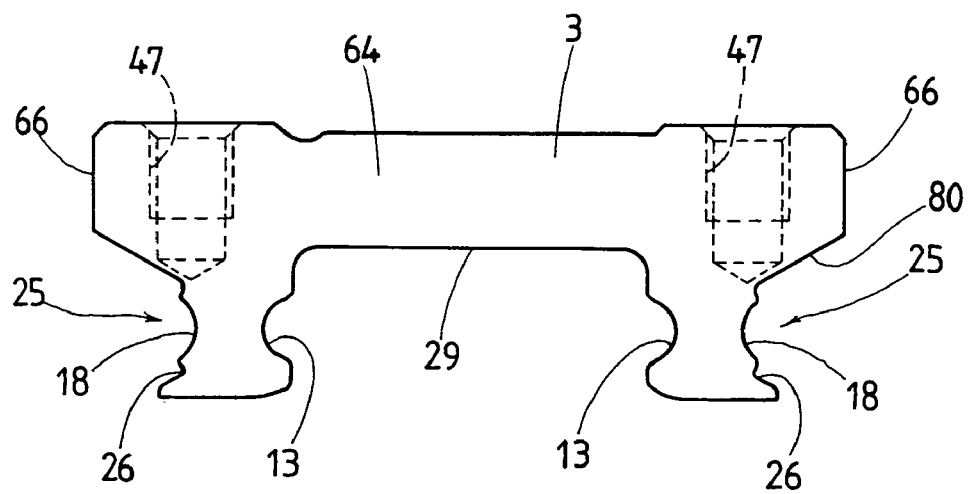
FIG. 9 is a view in side elevation of the carriage of FIG. 8.

The carriage 3 will be further explained later with reference to FIGS. 8 and 9.

The carriage 3 is made of any material including metals, and so on, which is rich in rigidity or stiffness, and made recessed fore and aft at 29 to fit over and conform to the guide rail 1. The carriage 3 has the raceway grooves 13 extending fore and aft on inward sides defining the recess 29 and also has the outward major grooves 25 extending fore and aft on the widthwise opposite sides 66. The outward major grooves 25 are each designed to have the return groove 18 made arc in transverse section in preparation for the return passage 17. The outward major grooves 25 further include the minor grooves 26 extending below the return grooves 18 in close along the return grooves 18. Moreover, the minor grooves 26 are each defined with a slantwise jetty predominant over the return grooves 18.

Figure 10:
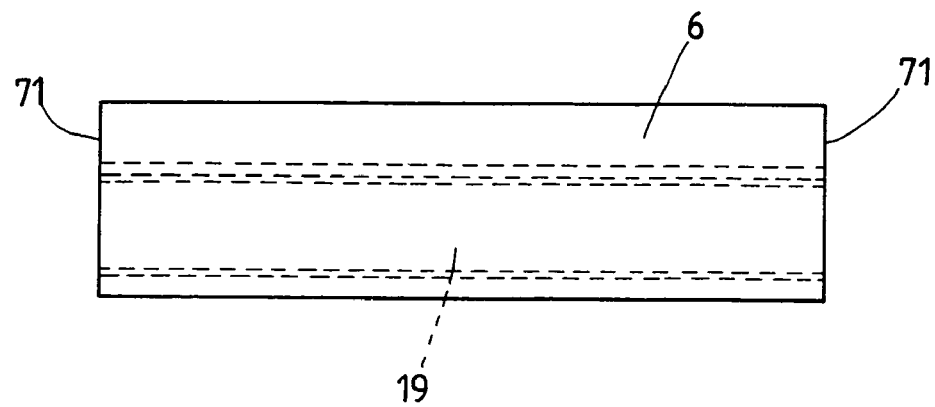
FIG. 10 is a view in front elevation of a lubricant applicator in the slider of FIG. 7.
Figure 11:
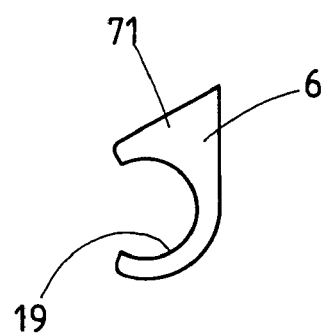
FIG. 11 is a view in side elevation of the lubricant applicator of FIG. 10.
Figure 12:
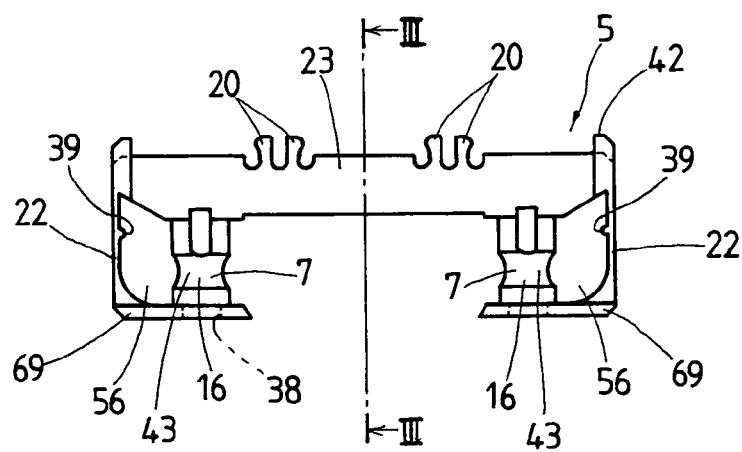
FIG. 12 is a view in side elevation of a carriage casing in the linear motion guide unit of FIG. 1.
Figure 13:
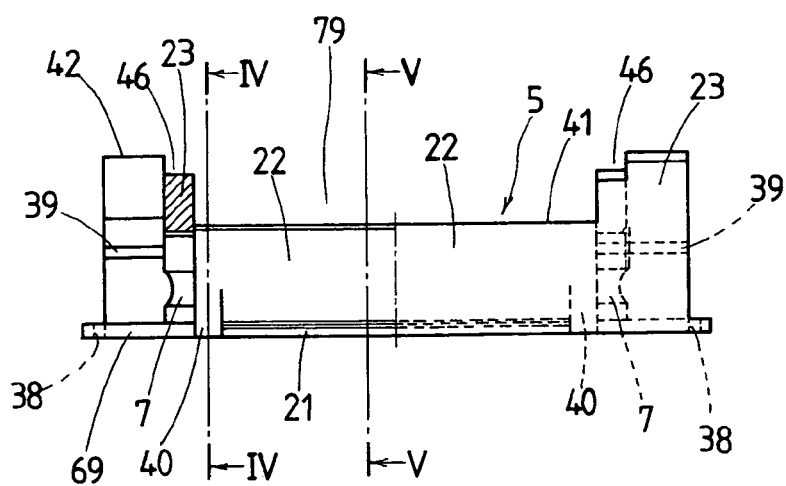
FIG. 13 is a view in front elevation of the carriage casing, but a left half thereof being viewed on a cross section taken in a plane III—III of FIG. 12.
Figure 14:
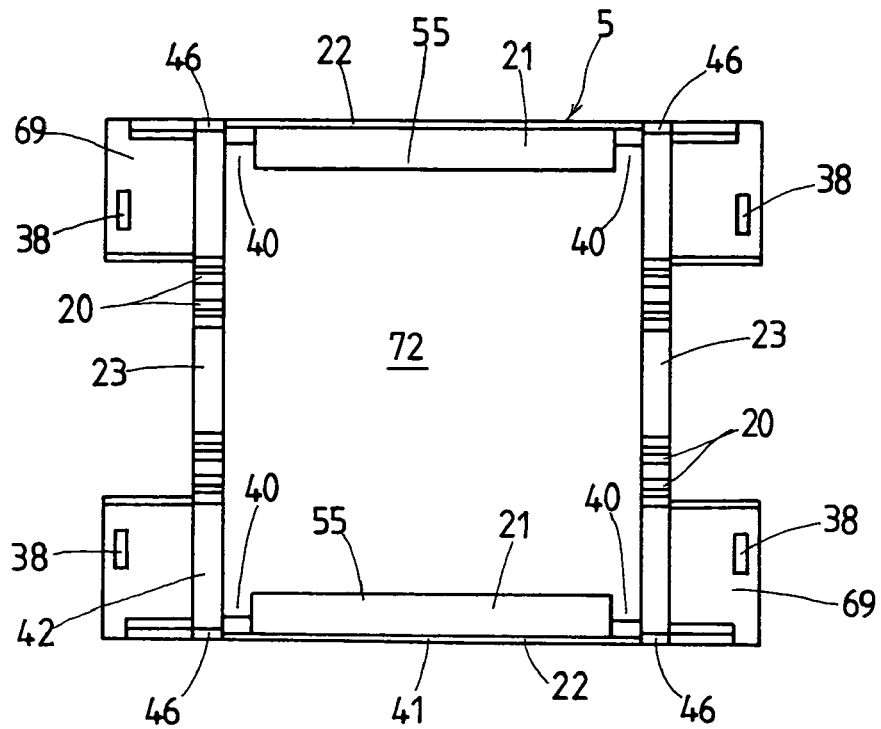
FIG. 14 is a plan view of the carriage casing of FIG. 12.
Figure 15:
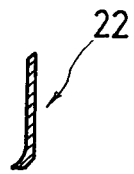
FIG. 15 is a view in section of a side panel of the carriage casing, the view being taken in a plane IV—IV of FIG. 13.
Figure 16:
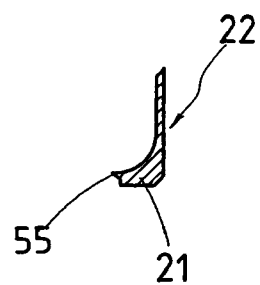
FIG. 16 is a view in section of the side panel of the carriage casing, the view being taken in a plane V—V of FIG. 13.
Figure 17:
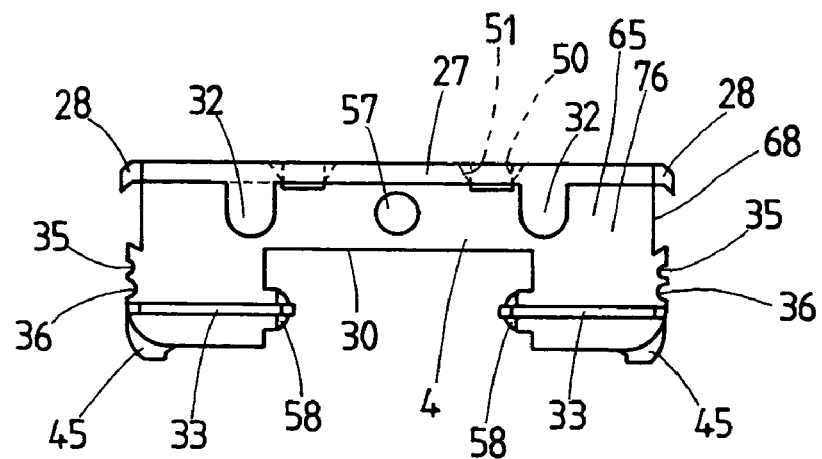
FIG. 17 is a view in side elevation of an end cap in the linear motion guide unit of FIG. 1.
Figure 18:
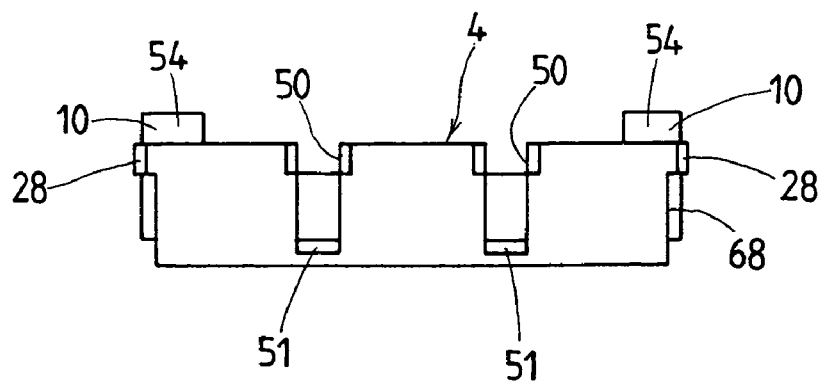
FIG. 18 is a plan view of the end cap of FIG. 17.

The lubricant applicators 6 will be described later in detail with reference to FIGS. 10 and 11.

Figure 5:
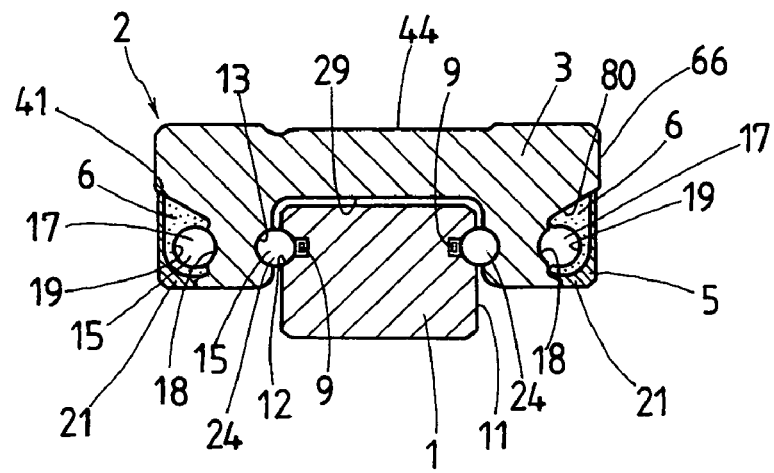
FIG. 5 is a view in transverse section along a plane I—I of FIG. 3 showing the linear motion guide unit.
Figure 6:
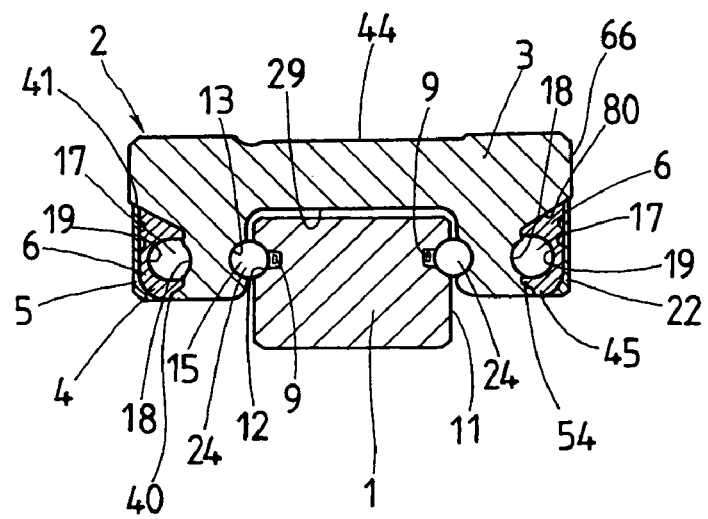
FIG. 6 is a view in transverse section along a plane II—II of FIG. 3 showing the linear motion guide unit.

The lubricant applicators 6 of the embodiment discussed here is constructed to meet with needs of maintenance-free operation in the recently advanced linear motion guide units. The lubricant applicators 6 of the embodiment discussed here is made of a sintered resinous member having porous or cellular texture of finely powdery ultrahigh molecular weight synthetic resin. Cells or voids left among the sintered grains are filled with any lubricant selected depending on anticipated functional demands. With the lubricant applicators 6 made as stated earlier, it is allowed to withdraw the lubricant once charged into cellular texture, instead get the lubricant applicator impregnated with other desired lubricant. The lubricant applicators 6 may be produced with, not just the sintered resins, other materials including ceramics, fluorine-contained resins, sintered steels, and so forth. The lubricant applicators 6 are envisaged fitting into the fore-and-aft major grooves 25 cut in the sides 66 of the carriage 3 to complete the return passages 18 that are circular in cross section. To this end, the lubricant applicators 6 are each made with an arc groove 19 of an imperfect circle, or C-shape, in transverse section to be complementary to the return grooves 18 on the carriage 3. Moreover, the lubricant applicators 6, as shown in FIGS. 5 to 7, are beveled at their upper surfaces to make it easier to guide the lubricant applicators 6 in place, even with making certain of ample volume to contain much lubricant therein. The lubricant applicators 6 are further made shorter in overall length than the carriage 3. When joining the end caps 4 together with the carriage 3, accordingly, the return spigots 10 extending out of the end caps 4 are introduced from the forward and aft ends 64 of the carriage 3 until coming into abutment against the forward and aft ends 71 of the lubricant applicators 6. Thus, the return passages 17 are finished with the combination of all the return grooves 18 on the carriage 3, the return grooves 19 in the lubricant applicators 6, and the return spigots 10 jutting out of the end caps 4.

The carriage casing 5 will be described later in detail with reference to FIGS. 12 to 16.

The carriage casing 5 is made of synthetic resins with using injection molding process, and comprised of the end panels 23 conforming to the forward and aft ends 64 of the carriage 3, one to each end, and side panels 22, 23 conforming to the fore-and-aft sides 66 of the carriage 3, one to each side. The end and side panels 22, 23 are all joined together with one another to define central well 72 to accommodate snugly the carriage 3 therein. The side panels 22 extend endwise beyond the end panels 23 into lengthwise jetties where there are provided the bottoms 69 integrally along the lower edges thereof to make ample spaces to embrace the end caps 4 therein. On the side panels 22 of the carriage casing 5, there are also provided shelves 21 extending inwards into the central well 72 to close the fore-and-aft major grooves 25 from below to conform to the lower surfaces of the lubricant applicators 6 from below. The carriage casing 5 has some mating parts adapted to make fit-engagement with their complementary counterparts of other components including the carriage 3, end caps 4 and end seals 8. The mating parts made on the carriage casing 5 includes the recesses 46 made open upwards on the side panels 22 at corners where the side panels 22 meet with their associated end panels 23, the dowels 20 extending upwards above the end panels 23, each of which is made of a pair of forked pins that are spaced away from one another and have distal ends enlarged in thickness to be susceptible of elastic deformation, the ribs 39 raised lengthwise above the inside surfaces of the side panels 22 terminating in the outward edges 67, the recesses 40 or third recesses made open to the central well 72 by partially cutting away the lower edges 21 of the side panels 22 at the corners where the side panels 22 meet with the end panels 23, fore-and-aft sharp edges 55 of the shelves 21 of the side panels 22, and slits 38 made in the bottoms 69 that extend beyond the end panels 23 towards the outward edges 67. The fore-and-aft sharp edges 55 of the shelves 21 are the projections that are so small to be negligible for the mating parts of the carriage casing 5, but allowed to come into fit-engagement with minor grooves 26 of the carriage 3.

Figure 19:
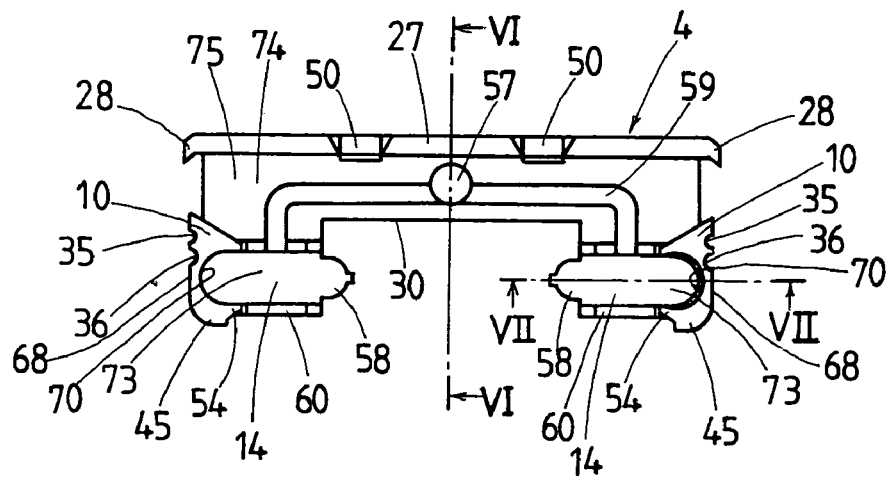
FIG. 19 is a view in rear elevation of the end cap of FIG. 17.
Figure 20:
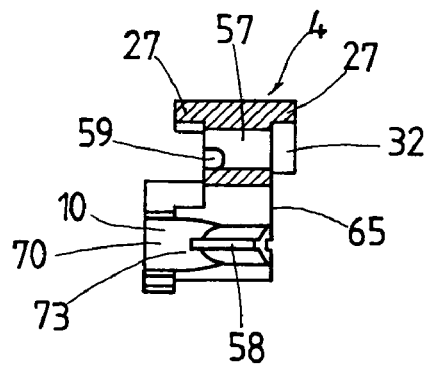
FIG. 20 is a view in longitudinal section along a plane VI—VI of FIG. 19 showing the end cap.
Figure 21:
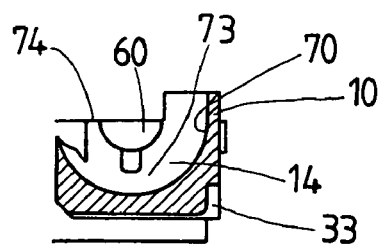
FIG. 21 is a view in cross section along a plane VII—VII of FIG. 19 showing the end cap.

With the linear motion guide unit constructed according to the embodiment as stated earlier, the end panels 23 of the carriage casing 5 are integrally made with the pillars 7 that join with the bottoms 69 and have thereon the radially inside curved grooves 16 serving as the turnaround grooves 43 of the turnaround passages 14. The pillars 7 are made on the end panels 23 in a way spaced widthwise away from one another to allow the turnaround grooves 43 communicating the raceway grooves 13 and the return grooves on the carriage 3 with each other. In other words, the carriage casing 5 includes four pillars 7 thereon. The pillars 7 fit into concaves 60 made in the end caps 4 as shown in FIGS. 19 and 21, cooperating with the end caps 4 to define the turnaround passages 14 between them. With the linear motion guide unit constructed as stated earlier, the end panels 23 of the carriage casing 5, along with lending the widthwise stiffness to the side panels 22, are equipped with the pillars 7 having the radially inside curved grooves 16 to form the turnaround grooves 43 of the turnaround passages 14, thereby partially sharing the duties of the end caps 4. Thus, unlike the prior linear motion guide unit in which the end cap includes the pillars or spacers made thereon with the radially inside curved grooves of the turnaround passages while the end panels of the carriage casing are farther out of the outward end surfaces 65 of the end caps, the linear motion guide unit of the present invention features that the end panels 23 of the carriage casing 5 are inside the inward surfaces 74 of the end caps 4, and equipped with the pillars or spacers made thereon with the radially inside curved grooves of the turnaround passages, which have been conventionally made in the end caps.

Next, the end cap 4 will be explained below in detail with reference to FIGS. 17 to 21.

The end caps 4 of synthetic resins is produced using injection molding process, and constructed to have radially outside turnaround grooves 73 of the turnaround passages 14. The radially inside curved grooves 16 to form the turnaround grooves 43 of the turnaround passages 14 are made on the pillars 7 integral with end panels 23 of the carriage casing 5. Thus, the turnaround passages 14 are each defined between the outside turnaround groove 73 of the end caps 4 and the inside turnaround groove 43 on the pillar 7 of the carriage casing 5. The end caps 4 are made concaved at 30 to fit over and conform to the guide rail 1. Each end cap 4 is provided therein with scoop claws 58 to make certain of smooth transfer of the rolling elements 15 through the recirculating circuits. To this end, the scoop claws 58 are made at the ends of the turnaround passages 14 to protrude into the concave 30 to fit into the raceway grooves 12 on the guide rail 1. The end caps 4 has the return spigots 10 that are raised above an end surface 74 facing the carriage 3. In the return spigots 10, there are formed return grooves 70 to complete the return passages 10. The return spigots 10, after having fit into the forward and aft ends of the major grooves 25 on the carriage 3, make the forward and aft end parts of the return passages 17 to communicate the return grooves 18 on the carriage 3 with the turnaround grooves 73 in the end caps 4. Thus, the return spigots 10 of the end caps 4 help render the smooth communication with the return passages 17 easier, making sure of smooth rolling of the rolling elements 15. The return spigots 10 are made in conformity with the grooves 18 on the carriage 3. The end caps 4 are each set back at 75 on the end surface 74 facing the carriage 3 to fit over the associated end panels 23 of the carriage casing 5, while at 76 on the outward end surface to fit over the associated end seals 8, with forming the flange 27 at the top surface thereof.

The end cap 4 has some mating parts adapted to make fit-engagement with their complementary counterparts of other components including the carriage 3, carriage casing 5 and end seals 8. The mating parts made on the end cap 4 includes the sidewise projections 28 and the holes 50 made on the flange 27, the slots 35 cut in the sides getting the return spigots 10, the noses 54 and the raised portions 45 formed on return spigots 10, the slits 51 cut in the flange 27 to reach the holes 50, and U-shaped tabs 32 protruding out of the flange 27. Moreover, the end caps 4 are each provided on the widthwise opposite sides 68 thereof with the slots 36 that are slightly spaced away from and in parallel with the slots 35 to tentatively keep the associated ribs 39 of the carriage casing 5 there while assembling the end caps 4 with the carriage casing 5. On the outward end surfaces of the end caps 4, there are made grooves 33 extending horizontally extending from the tips of the scoop claws 58 to the sides 68 to fit over the retainer bands 9. The end caps 4 each have a central lubricant port 57 and a pair of lubricant grooves 59 that make, in combination with the associated end panels 23 of the carriage casing 5, lubricant passages to lead lubricant to the turnaround passages 14.

Figure 22:
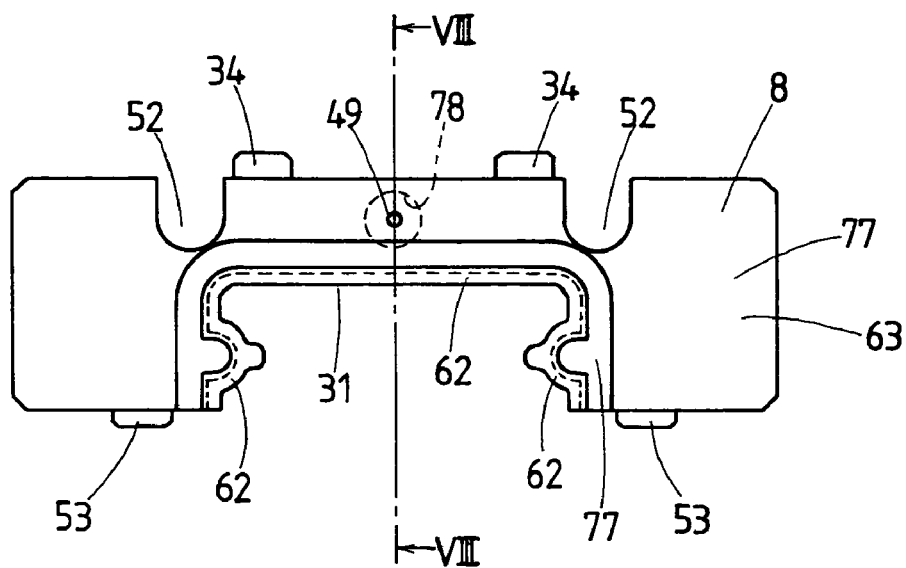
FIG. 22 is a view in side elevation of an end seal in the linear motion guide unit of FIG. 1.
Figure 23:
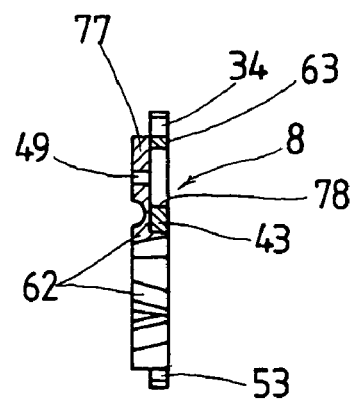
FIG. 23 is a view in longitudinal section along a plane VIII—VIII of FIG. 22 of the end seal.

The end seals 8 will be finally described later with reference to FIGS. 22 and 23.

The end seals 8 of the present embodiment are each composed of a metal core 63 and a synthetic resin member 77 baked on the metal core 63. The end seal 8 is also made concaved at 31 to fit over and conform to the guide rail 1, and the concaved surface 31 is hemmed with resilient lip 62 having sealing property. The sealing lip 62 made raised partially on sidewise opposing sides thereof to fit into their associated raceway grooves 12 on the guide rail 1. With the end seal 8 of the embodiment shown in FIG.22, the synthetic resin member 77 is made with a small lubricant hole 49 while the metal core 63 is made with an opening 78 in opposition to the lubricant hole 49 to receive therein a grease nipple. The small lubricant hole 49 is ready for lubrication using any lubricant applicator including an injector, and so on, which has a pointed nose adapted to be forced into the lubricant hole 49. The lubrication way as stated just earlier is preferable for the linear motion guide unit especially made very tiny in construction. The end seal 8 has some mating parts, any one for fit-engagement with the associated end cap 4 and the other for the carriage casing 5. Especially, the end seal 8 has the upper raised portions 34 and the U-shaped notches 52 on the upper edge thereof while the lower raised portions 53 on the lower edge thereof. According to the embodiment shown, the upper raised portions 34 and the lower raised portions 53 are all made on the metal core 63. The upper raised portions 34 and the lower raised portions 53 of the end seals 8 come into fit-engagement with their complementary slits 51 of the end caps 4 and the slits 38 of the carriage casing 5, respectively, while the notches 52 fit over the U-shaped tabs 32 of the end caps 4, so that the end seals 8 make sure of secure connection of the end caps 4 with the carriage casing 5.

With the linear motion guide unit constructed as stated earlier, the components including the carriage 3, end caps 4, carriage casing 5, lubricant applicators 6, retainer bands 9 and the end seals 8 are joined together into the finished product by using fit-engagements of mating parts mutually complementary to one another, which are carried out according to the assembling operations recited later. Thus, the constructional feature of assembly to make certain of steady connection among the components resides in mutual fit-engagement of any some mating parts of one component with the other mating parts of the other component, which are made complementary to the some mating parts of the one component.

In first phase, the sidewise projections 28 of the end caps 4 fit into the recesses 46 in the side panels 22 of the carriage casing 5 after the end caps 4 have been forced against the carriage casing 5 across the outward edges 67. The fit-engagements of the sidewise projections 28 with the recesses 46 make certain of secure engagement to keep the end caps 4 against loose connection with the carriage casing 5 in fore-and-aft direction, in other words, sliding or lengthwise direction of the carriage casing 5.

In second phase, the forked dowels 20 protruding above the end panels 23 of the carriage casing 5 fit into the holes 50 in the end caps 4 while experiencing elastic deformation when the end caps 4 are forced against the carriage casing 5 across the outward edges 67. The force fit of the forked dowels 20 into the holes 50 makes certain of secure engagement to keep the end caps 4 against loose connection with the carriage casing 5 in up-and-down direction or vertical direction.

In third phase, the slots 35 of the end caps 4 are forced to fit over the ribs 39 on the side panels 22 of the carriage casing 5 while the end caps 4 are forced against the carriage casing 5 across the outward edges 67. The fit of the slots 35 over the ribs 39 makes the tentative engagement to keep the end caps 4 in correct posture relatively to the carriage casing 5 in up-and-down direction or vertical direction. Then, after the carriage casing 5 has been pressed in vertical direction relatively to the end caps 4, the ribs 39 on the side panels 22 of the carriage casing 5 are subjected to elastic deformation to jump or transfer from the slots 36 where the ribs 39 have tentatively been held there into the other slots 35 where the ribs 39 are press fit into there.

In fourth phase, the raised portions 45 of the end caps 4 fits into recesses 46 in the side panels 22 of the carriage casing 5 while the end caps 4 are forced against the carriage casing 5 across the outward edges 67. The fit of the raised portion 45 into their associated recesses 46 keeps securely the end caps 4 against loose connection in the fire-and-aft direction or the sliding direction.

In the fifth phase, the noses 54 on the return spigots 10 of the end caps 4 fit into the minor grooves 26 in the fore-and-aft major grooves 25 of the carriage 3 while the end caps 4 are forced against the carriage casing 5 across the outward edges 67. The fit of the noses 54 into their associated minor grooves 26 keeps securely the end caps 4 against loose connection with the carriage 3 in up-and-down direction or vertical direction, thereby fastening securely the carriage casing 5 while keeping the end panels 23 between the carriage 3 and the end caps 4.

In the sixth phase, the upper raised portions 34 of the end seals 8 fit into the slits 51 on the flanges 27 of the end caps 4 while the end seals 8 are applied underside the flanges 27 of the end caps 4 along the outward end surfaces 65. The fit of the upper raised portions 34 into their associated slits 51 helps fasten securely the end seals 8 at their upper edges onto the end caps 4.

In seventh phase, the lower raised portions 53 of the end seals 8 fit into the slits 38 in the bottoms 69 of the carriage casing 5 when the end seals 8 are advanced into abutment against the outward end surfaces 65 of the end caps 4. The fit of the lower raised portions 54 into their associated slits 38 helps fasten securely the end seals 8 at their lower edges onto the carriage casing 5, thereby keeping securely the end caps 4 between the end seals 8 and the end panels 23 of the carriage casing 5 against loose connection in the fire-and-aft direction or the sliding direction.

In the eighth phase, while bringing the end seals 8 into abutment against the outward end surfaces 65 of the end caps 4, the notches 52 in the end seals 8 fit over the tabs 32 on the end surfaces 65 of the end caps 4. The fit-engagement of the tabs 32 into the notches 52 makes it easier to attach other component, not shown, on the outward end surfaces of the end seals 8. For example, it will be easier to locate any other required component on the tabs 32 exposed outside. It will be further allowable to make any threaded hole on the tabs 32, which is used to fasten any other part to the end seals 8.

Figure 7:
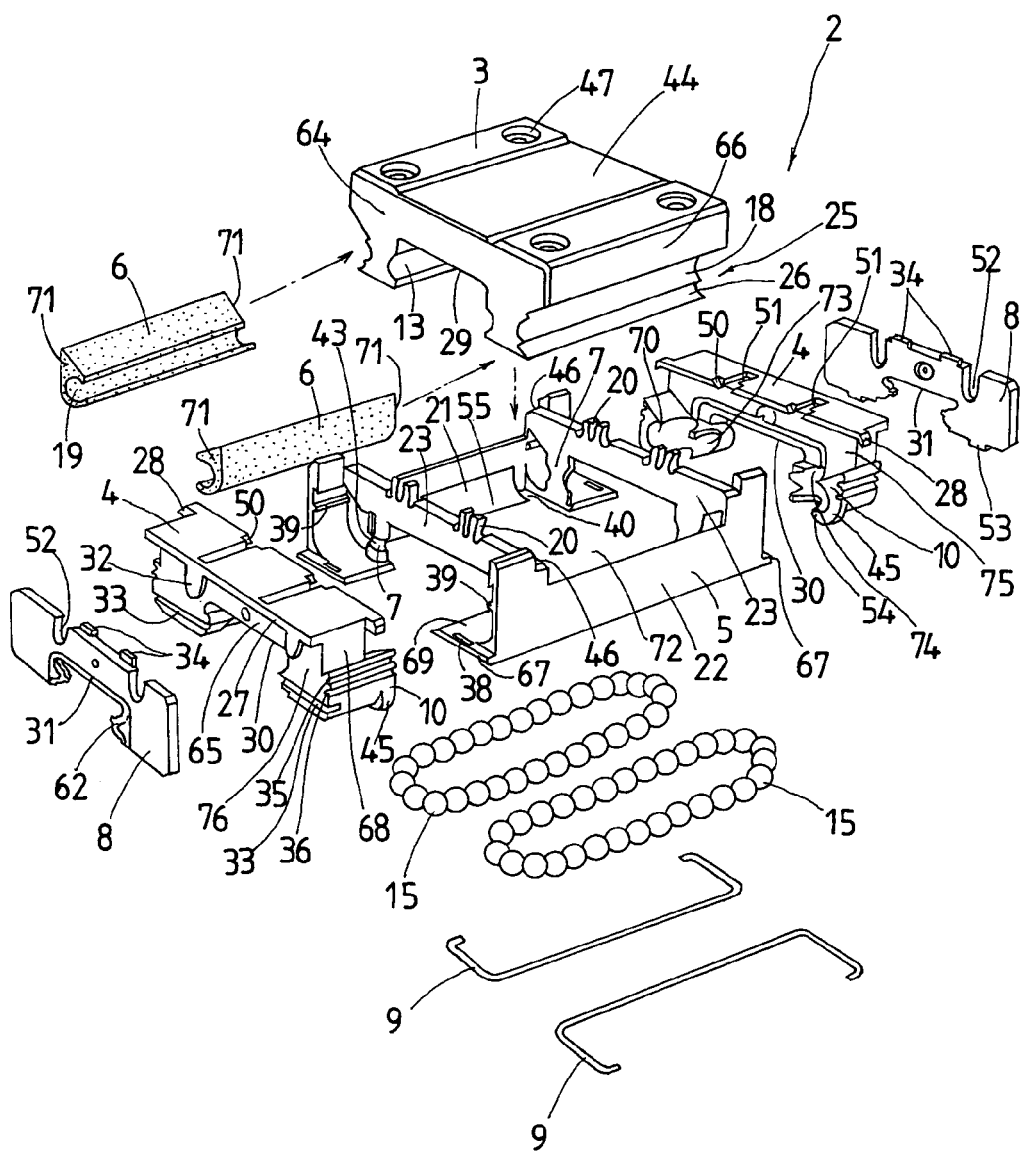
FIG. 7 is an exploded view in perspective showing a slider in the linear motion guide unit of FIG. 1.

Reviewing again the exploded view in FIG. 7, the first to eighth phases to make fit-engagements to finish the linear motion guide unit have to first start with the fifth phase. Then, the carriage casing 5 is forced at a stretch to fit firmly over the carriage 3 and the other phases are made through the sequence the first, second, third, fourth, sixth, seventh and the eighth. With the joining phases to produce the slider 2 as stated just earlier, the necessary components: carriage 3, end caps 4, carriage casing 5 and end seals 8 are all joined together with no fasteners including bolts, screws, and so on used conventional assembly operations, but mutual fit-engagement of any components with their mating counterparts.

What is claimed is:

1. A linear motion guide unit; comprising a guide rail having first raceway grooves on lengthwise sides thereof, and a slider conforming to the guide rail to fit over the guide rail for movement relatively to the guide rail by virtue of more than one rolling element;
   wherein the slider is composed of a carriage having second raceway grooves in opposition to the first raceway grooves to define load races between them and having return passages in parallel with the load races, end caps arranged on fore-and-aft ends of the carriage, one to each end, and each made therein with the turnaround passages to communicate the load races with the return passages, and end seals installed on the end surfaces of the end caps, one to each end cap, the carriage and the end caps joining together with one another to establish recirculating circuits including the load races, turnaround passages and the return passages to allow the rolling elements to roll through there;
   wherein the slider includes a carriage casing composed of sidewise opposing fore-and-aft side panels and forward and aft end panels spaced fore and aft and made integral with the side panel; and
   wherein the carriage, carriage casing and the end caps are joined together to form a complete slider in a way that the carriage fits into the carriage casing between the forward and aft end panels and further the end caps are joined to outward end surfaces of the end panels of the carriage casing where the carriage has fit into there, with using fit-engagement of mating parts of the end caps with other complementary mating parts on both the carriage casing and the carriage.

2. A linear motion guide unit constructed as defined in claim 1 wherein the end panels of the carriage casing are provided integrally thereon with pillars made thereon with radially inside turnaround grooves for the turnaround passages.

3. A linear motion guide unit constructed as defined in claim 1 wherein the mating parts made on the carriage are minor grooves cut along fore-and-aft major grooves that are made on widthwise opposing sides of the carriage, while the mating parts on the end caps are first projections raised on return spigot of the end caps to get fit into the minor grooves cut in the carriage.

4. A linear motion guide unit constructed as defined in claim 3 wherein the mating parts made on the carriage casing include first recesses made in the side panels to fit over second projections that are formed on flanges of the end caps to be complementary to the first recesses, third projections made in the end panels to fit into second recesses that are cut in the flanges of the end caps to be complementary to the third projections, fourth projections raised above inward surfaces of the side panels to fit into grooves that are cut in sides of the end caps to be complementary to the fourth projections, and third recesses made in inward surfaces of the side panels within the carriage casing to fit over fifth projections that are made on the return spigots of the end caps.

5. A linear motion guide unit constructed as defined in claim 4 wherein the mating parts of the end caps include the second projections and the second recesses, which are both made on the flanges of the end caps, the fifth projections made on the return spigots of the end caps to fit into the third recesses cut in the side panels of the carriage casing, the first projections raised on return spigot of the end caps to fit into minor grooves cut in the carriage, and the grooves cut in the sides of the end caps to fit over the fourth projections raised above the inward surfaces of the side panels to guide the end caps along there.

6. A linear motion guide unit constructed as defined in claim 4 wherein assembly of the end caps on the carriage casing is carried out in a way that the end caps are first applied to the carriage casing in such a relation the fourth projections cut in the inward surfaces of the side panels make interim fit-engagement with slots made in parallel with the grooves on the sides of the end caps, then followed by making final fit-engagement with the grooves on the sides of the end caps after the fourth projections have further forced to make press fit into the grooves.

7. A linear motion guide unit constructed as defined in claim 4 wherein the third projections made on the end panels of the carriage casing to fit into the second recesses in the end caps are made in shape susceptible to elastic deformation to make it easier to get them press fit into the second recesses.

8. A linear motion guide unit constructed as defined in claim 3 wherein lubricant applicators are arranged in opposition to the major grooves so that the return passages are made up of first return grooves made in the major grooves and second return grooves made in the lubricant applicators, which merge with one another into the return passages.

9. A linear motion guide unit constructed as defined in claim 1 wherein the end seals have mating parts including sixth projections made on upper edges of the end seals to fit into first holes in the flanges of the end caps, and seventh projections made on lower edges of the end seals to fit into bottoms of the carriage casing where the end seals are applied there, so that the end seals come into fit-engagements with both the flanges of the end caps and the bottoms of the carriage casing.

* * * * *